United States Patent [19]

Gutmark et al.

[11] Patent Number: 5,361,710
[45] Date of Patent: Nov. 8, 1994

[54] METHOD AND APPARATUS FOR THE ACTIVE CONTROL OF A COMPACT WASTE INCINERATOR

[75] Inventors: Ephraim Gutmark; Klaus C. Schadow; Timothy P. Parr; Donna M. Hanson-Parr; Kenneth J. Wilson; Robert A. Smith; Richard A. Stalnaker, all of Ridgecrest, Calif.

[73] Assignee: The United States of America as represented by the Secretary of the Navy, Washington, D.C.

[21] Appl. No.: 138,044

[22] Filed: Oct. 7, 1993

[51] Int. Cl.5 .................................... F23C 11/04
[52] U.S. Cl. ........................ 110/346; 110/181; 110/191; 431/1; 431/114
[58] Field of Search .............. 110/185, 186, 189, 191, 110/243, 244, 101 CB, 346; 431/1, 114; 60/39.76

[56] References Cited

U.S. PATENT DOCUMENTS

| | | | |
|---|---|---|---|
| 4,080,149 | 3/1978 | Wolfe | 431/1 |
| 4,221,174 | 9/1980 | Smith | 110/265 |
| 4,473,348 | 9/1984 | Tikhonovich et al. | 431/1 |
| 4,488,516 | 12/1984 | Bueters et al. | 122/379 |
| 4,533,082 | 8/1985 | Maehara et al. | 239/102 |
| 4,583,936 | 4/1986 | Krieger | 431/1 |
| 4,881,373 | 11/1989 | Yamaguchi et al. | 60/732 |

OTHER PUBLICATIONS

"Soot Formation in Turbulent Flames", E. Gutmark, T. P. Parr, D. M. Hanson-Parr and K. C. Schadow, Paper No. 92-70, 12-13, Oct. 1992.

Primary Examiner—Henry A. Bennet
Assistant Examiner—William C. Doerrler
Attorney, Agent, or Firm—Robert J. Hampsch; Melvin J. Sliwka; John L. Forrest, Jr.

[57] ABSTRACT

An improved method and apparatus for actively controlling a combustion process such as a waste incinerator by means of a spatial and temporal synchronized injection of fuel. The improved method and apparatus employs an active control system which controls the intentional formation of large scale, coherent vortices and the synchronized injection of the fuel supply at various locations relative to the formation of the vortices. The preferred apparatus comprises an actuator or similar structure that is adapted for producing and stabilizing discrete, large scale vortices in a combustion device. In addition, another device controls or modulates the injection of the fuel into the vortices at the optimal location and timing relative to the vortex cycle. As applied to an incinerator, this method can be optimized to ensures that the fuel and waste are introduced into the highest temperature locations, were extended residence times are obtained by trapping the fuel and waste inside the vortices. A high combustion efficiency may also be achieved by actively synchronizing the periodic fuel injection with the formation of the vortices.

26 Claims, 3 Drawing Sheets

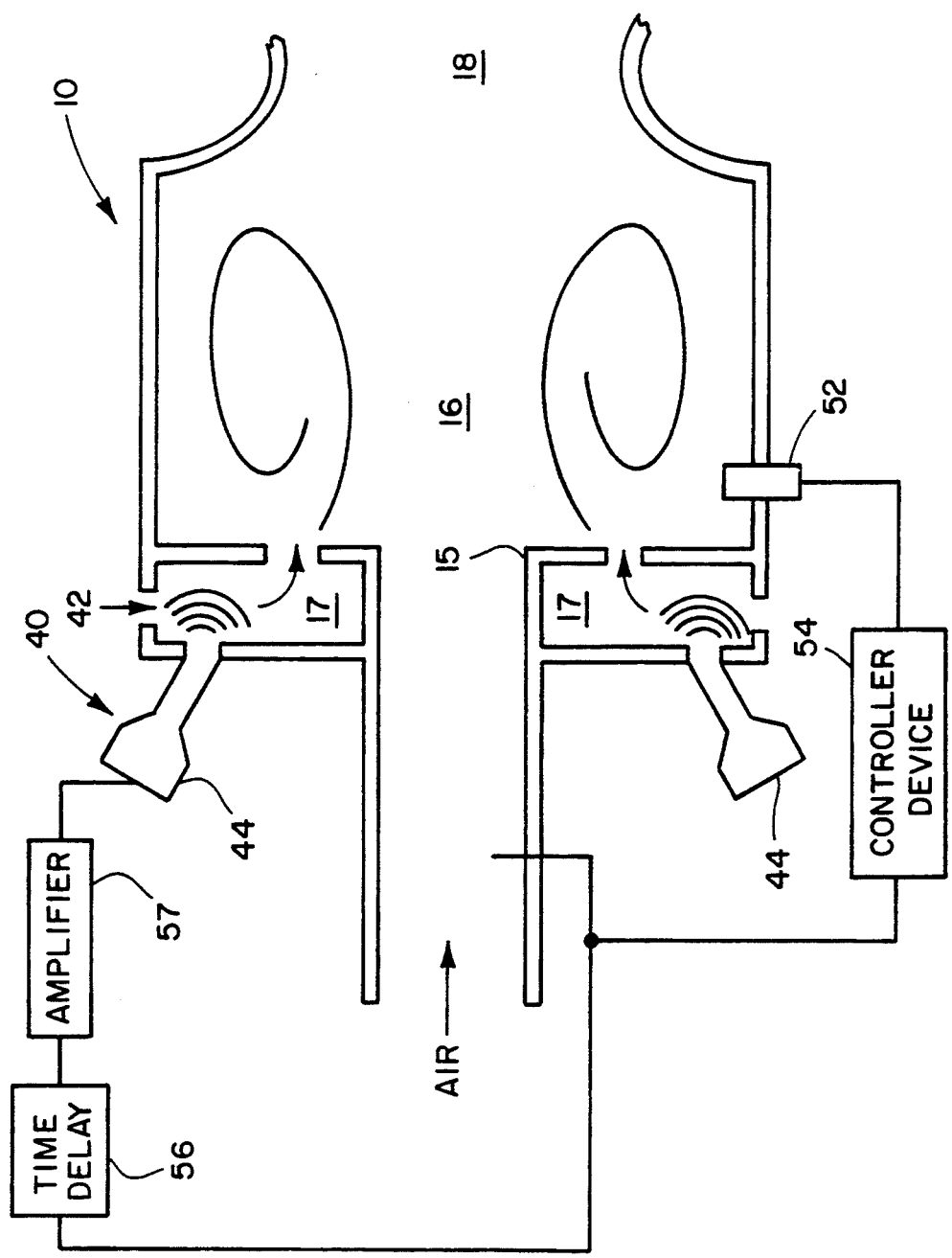

METHOD AND APPARATUS FOR THE ACTIVE CONTROL OF A COMPACT WASTE INCINERATOR

BACKGROUND OF THE INVENTION

1. Field of the Invention

The present invention generally relates to incinerators and more particularly to a method and apparatus for the active control of compact waste incinerators. Specifically, the present invention provides a means to improve the combustion efficiencies of various combustion devices such as incinerators through the production, placement and stabilization of large scale vortices within a combustion chamber coupled with the controlled and synchronized injection of the fuel and waste relative to the large scale vortices.

The present invention further provides an alternative means to control the formation of soot or other emissions that result from standard combustion processes. The production or reduction of soot is controlled by virtue of synchronizing the fuel injection with the intentional formation of large scale vortices proximate the entrance to the combustion chamber.

2. Related Art

The destruction of hazardous waste in an incinerator is dominated by several factors including the combustion temperatures, fuel and waste residence time, and the fine-scale mixing of the fuel, waste, and oxidizer. Existing incineration technology includes rotary kilns, fixed and multiple hearth incineration devices, fluidized bed incinerators, and liquid injection incinerators. These incineration devices are typically large incinerators which rely on high heat capacity and long residence time to achieve the required destruction capacity demanded of most incinerators. These devices achieve the long residence times and high heat capacity by typically using a very large combustion chamber. Consequently the total operational cost of these conventional incineration devices is relatively high and unacceptable emissions often result when the incinerator is operated outside the optimum or design conditions.

Compact incinerators, derived from commonly used aerospace propulsion technology, such as a ramjet, can achieve the required destruction capacity in a small-scale device, with much shorter incineration time and higher combustion efficiency. Compact incinerators have the additional advantage of eliminating the need to transport waste from remote locations to a central incineration facility by allowing on-site disposal using a small scale device at a reasonable cost.

Compact incineration devices, however, require a highly optimized and effectively controlled combustion process to achieve and maintain reliable operation. Significant areas of concern for compact incineration devices include achieving increased thermal destruction efficiency, yet maintaining pollutant emission control. Increased thermal destruction efficiency pertains to the complete destruction of various types of waste, including hazardous waste, using an incineration process. A certain level of thermal destruction efficiency is needed to certify an incinerator for industrial use. The incineration process as well as other combustion or chemical processes, also need to be accomplished with minimal amount of particle emissions and gaseous pollutant emissions.

Consequently, there exists a continuing need for a reliable and relatively inexpensive method of actively controlling any combustion process in order to improve the overall performance of the combustor. More specifically there is a need to provide a means to control an incineration or combustion process in order to obtain high efficiencies with low pollutant emissions. Higher efficiencies and lower emissions of an incinerator will allow more latitude in the design of compact incinerators.

In addition, there is also a need to develop an alternative means to actively control the soot emissions in a given combustion process without adjusting the quantity of fuel required. In many combustion systems, it is desired to minimize the formation of soot in order to increase the efficiency. However, for energy exchange systems, the high radiation of soot is sometimes beneficial, and therefore the production of soot is encouraged. Historically, the production or reduction of soot was controlled by adjusting the quantity of fuel introduced into the combustion process. This approach however, had several serious disadvantages including a high cost of fuel required to produce a given amount of soot, or inability to maintain the combustion process due to insufficient fuel.

Passive and active combustion control has been applied to ramjets in order to improve the performance of an enclosed combustor. This control, which is based on detailed understanding of the interactions between shear flow dynamics, combustion, and acoustics, resulted in increased heat release, wider flammability limits, and reduced pressure oscillations.

The combustion characteristics of an enclosed combustor, including flammability limits, instability, and efficiency is closely related to the interaction between shear flow dynamics of the fuel and air flow at the inlet and acoustic modes of the combustor. Strong interaction, between the acoustic modes of the combustor and the airflow dynamics may lead to highly unstable combustion. Specifically, unstable combustion may occur when the acoustic modes of the combustor match the instability modes of the incoming airflow. For such conditions, the shedding of the airflow vortices upstream of the combustion chamber tends to excite acoustic resonances in the combustion chamber, which subsequently cause the shedding of more coherent energetic vortices. The continued presence of such vortices provides a substantial contribution to the overall efficiency of the combustion process.

Passive control has historically involved modification to the fuel injection distribution pattern and changes to the combustor geometry. For example, in the dump combustor, nonstandard inlet duct cross-sections were used to control the generation and breakdown of large-scale vortices which play a critical role in driving pressure oscillations and determining the flammability limits. Also, passive control of the combustion characteristics has been achieved by utilizing bluff-body flame holders at the downstream facing step into a dump combustor.

In recent years, however, active combustion control has received increasing attention. In active control, various control devices such as actuators are used to modify the pressure field in the system and regulate the air or fuel supply. Several different types of active control devices have previously been used in laboratory experiments. These active control devices include; loudspeakers to modify the pressure field of the system or to obtain fuel flow regulation; pulsed gas jets aligned across a rearward facing step; adjustable inlets for time-variant change of the inlet area of a combustor; and solenoid-type fuel injectors for controlled unsteady addition of secondary fuel into the main combustion zone. These active control devices have proven to be somewhat successful in suppressing pressure oscillations and extending flammability limits when the combustor operates at low heat release rates.

Unfortunately the existing trend in active control techniques for a combustor is towards decreasing performance of the controller with increasing energy levels within the combustor. Reversing this trend is a problem that has received increasing attention.

SUMMARY OF THE INVENTION.

As stated previously, the destruction of waste in an incinerator or other combustion device is dominated by three factors: temperature, residence time, and mixing characteristics. The present invention is a compact incinerator which optimize these three factors by using conventional ramjet technology together with an improved active control technique.

The invention is based on active control of combustion and understanding of vortex dynamics and their effect on the mixing process. Vortices are an efficient fluid mechanical mixing method. They promote both stirring and fine scale mixing processes. Occasionally, they occur naturally in a combustion system for a certain operational range. However, through the use of active control techniques the existence of large scale, coherent vortices can be ensured for any condition.

The active control technique is preferably comprised by two distinct but related subsystems. In the first subsystem, a positive feedback loop controls a vortex generating actuator by monitoring the pressure fluctuations in the chamber and sends a corresponding signal to the vortex generating actuator to further influence the flow inside the combustor. The second subsystem of the active control system uses the signal which was fed into the vortex generating actuator as a reference signal to ultimately control the fuel and waste injection with the aid of a fuel regulator.

The operation of the vortex generating actuator, induces the roll-up of vortices of a particular dimension and at a desired location downstream of the combustor dump station. The stabilization of these air vortices yields a spatial and temporal reference point for effective fuel and waste injection and thus a more efficient combustion. Various experiments have determined that injection of fuel and waste into the incipient vortex in the shear layer results in good large scale mixing as well as fine scale mixing.

The large-scale vortices are generated and stabilized in the combustion chamber using acoustic, mechanical, or spark actuators. The preferred actuator is a flame kernel pulse actuator shown and described in U.S. patent application Ser. No. 08/106,866 now pending.

The preferred flame kernel pulse actuator produces discrete pressure pulses through the generation of periodic flame kernels by spark ignition of an air and fuel mixture. The flame kernels propagate in an outward and downstream direction and are subsequently released into the airflow. As the flame kernels propagate toward the combustion chamber, they also release a predetermined quantity of energy into the airflow. This release of energy is dependent on the quantity of fuel injected, and the timing and energy input from the igniter. The result is a series of intentionally generated large scale vortices within the combustion chamber which ultimately affect the mixing of the air and fuel to alter the combustion process.

As discussed above, the fuel or waste or their mixture are thus injected into a particular location at the initiation of the vortex roll-up. This timing is achieved by synchronizing the fuel regulator or fuel modulator with the flame kernel pulse actuator or other vortex generating actuator. In this way, fuel consumption is minimized relative to the conventional incineration technique where a continuous supply of fuel is injected within the combustion chamber. Emissions are minimized as well. Fuel and waste injected in this pattern will be burned more efficiently due to the high local temperatures and the longer residence time provided by the vortex roll-up time. Exhaust gases are monitored continually by residual gas analyzer. The output of this sensor can be incorporated in a dual input controller to further optimize the combustor operation.

A similar concept may be used in many other combustion systems to maximize combustion efficiency by synchronized injection of the fuel into these intentionally created large scale vortices. The controlled injection can be adjusted to minimized soot and other undesired emissions or to maximized soot emissions in applications which require high radiative heat transfer.

A distinct advantage of the present invention is that it reduces the incineration time of various waste within an incinerator while maintaining a high thermal destruction efficiency and minimizing unwanted emissions. This improved method thus allows a significant reduction in the size of a given incinerator while still achieving the performance of a larger capacity incinerator.

Accordingly, it is an object of the present invention to provide an improved method and apparatus for actively controlling a waste incinerator yielding an improved efficiency with low emissions.

It is another object of the present invention to provide an improved method and apparatus for actively controlling the efficiency of the incineration process through the generation, propagation, and introduction of discrete pressure oscillations into the combustion chamber which results in better mixing of the fuel and air.

It is another object of the present invention to provide an improved method and apparatus for actively controlling the formation of large scale, coherent vortices within a combustion chamber of an incinerator.

It is yet another object of the present invention to provide a method and apparatus for actively controlling the injection and regulation of fuel and waste into specified locations in large scale, coherent vortices to improve the thermal destruction efficiency of an incinerator.

It is yet another object of the present invention to provide a method and apparatus for actively controlling the injection and modulation of fuel into created vortices at designated phase shifts and locations in order to control a combustion process including the formation of soot and other emissions in a combustion device or energy transfer system.

An important advantage of the present invention is that the improved method and apparatus for actively controlling a combustion process represents a reliable, relatively low cost answer to improving the overall efficiency and performance characteristics of various combustion devices.

An important feature of the present invention is the generation of large-scale vortices in the combustion chamber using acoustic, mechanical or spark actuators.

Another important feature of the present invention is the modulation or regulation of the fuel and waste injection into the combustion chamber at designated locations and timing sequence relative to the formation of coherent vortices. This fuel and waste modulation or regulation can be achieved with the aid of mechanical or acoustic devices.

Yet another feature of the present invention is the active controllers which can effectively control the actuator which adjust the frequency, phase or magnitude of the generated large scale vortices. The active controllers further can effectively control the frequency, phase and rate of the fuel and waste injection.

The disclosed method and apparatus for the active control of a compact waste incinerator realizes the aforementioned objects, features and advantages in a manner that is clearly evident from a thorough consideration of the figures and detailed description that follows.

BRIEF DESCRIPTION OF DRAWINGS

FIG. 4 is a partial view of the preferred fuel modulation apparatus of the present invention. The fuel supply is shown being injected at a predetermined location and phase shift relative to the generated large scale, coherent vortices.

DETAILED DESCRIPTION

Description of Preferred Apparatus

The present invention is a method and apparatus for actively controlling a compact waste incinerator. Preferably, the improved method and apparatus employs a dual-control system which comprises at least two actuating devices or transducers. One of the actuators or transducers is adapted for producing and stabilizing discrete, large scale vortices in the combustor chamber. The other actuator device or transducer controls the injection of the waste and fuel into the vortices at the optimal location and timing relative to the vortex cycle. This method ensures that the waste is introduced into the highest temperature locations, were extended residence times are obtained by trapping the waste inside the vortices. A high combustion efficiency is also obtained by synchronizing the periodic fuel injection with the formation of the vortices.

Figure 1:
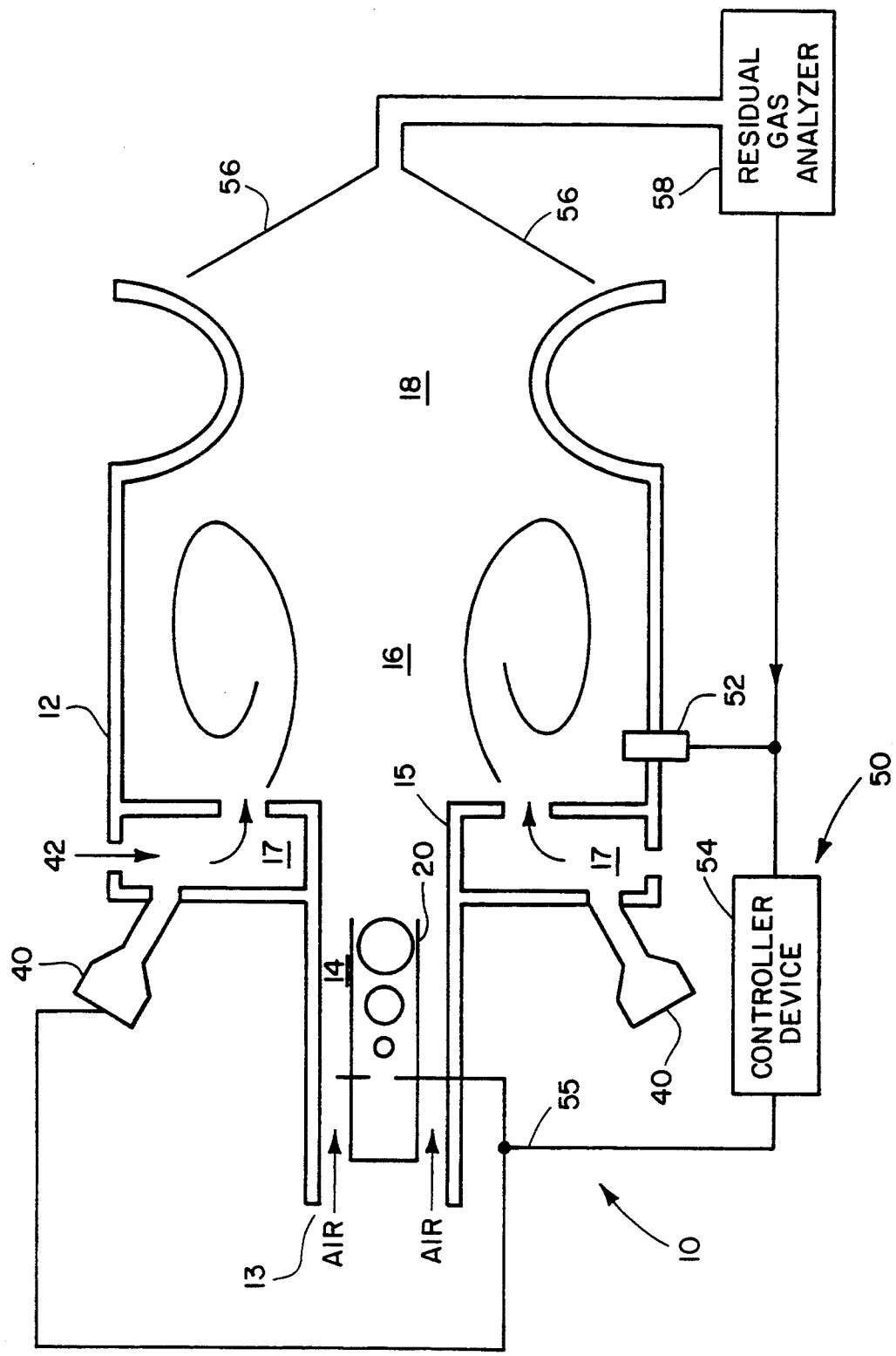
FIG. 1 is a schematic view of an actively controlled compact waste incinerator.

Referring now to the drawings and particularly FIG. 1, there is shown a schematic representation of the present invention. The preferred embodiment of the actively controlled compact incinerator is generally designated by the numeral 10. The actively controlled compact incinerator comprises an incinerator housing (12), a vortex generating actuator (20), a fuel and waste modulator (40), and an incineration control subsystem (50).

The incinerator housing (12) includes air inlet and transtage ducts (13,14), a cylindrical combustion chamber (16) including a dump station (15), a fuel and waste inlet duct (17), and an exhaust nozzle (18). Situated in the inlet or transtage duct (14) is the vortex generating actuator (20). This actuator (20) is adapted for the continuing generation and stabilization of large scale vortices in the combustion chamber (16). The vortex generating actuator (20) is preferable a flame kernel spark actuator but may also be an electro-acoustic transducer, electro-mechanical transducer or other type of electro-mechanical actuator.

The fuel and waste modulator (40) is located proximate the fuel and waste inlet duct (17). As a supply of fuel and waste (42) is transported through the fuel and waste inlet duct (17), the fuel modulator (40) controls the injection of the fuel and waste supply (42) into the combustion chamber (16). The preferred fuel modulator (40) is a simple mechanical actuator or an acoustic device such as a loudspeaker. The timing and location of the fuel and waste (42) injection relative to the formation of the large scale vortices is critical.

When the fuel and waste supply (42) is injected into a fully developed vortex, the vortex core becomes a fuel-rich region where the subsequent combustion process is inefficient. This inefficient combustion of the fuel results in an excessive quantity of soot being formed. In addition, a significant amount of waste may remain if the combustion process is not efficient.

On the other hand, when the fuel and waste supply (42) is injected into the incipient air vortex, the complete mixing of air and fuel is promoted and soot formation is thus avoided. This relatively efficient combustion will result in the complete incineration of more waste within a shorter time.

By adhering to this improved technique for the controlled injection of fuel and waste (42) into large-scale, coherent vortices as the vortices are being formed, the incineration time of the waste can be reduced permitting the overall reduction in size of the incinerator. The actual residence time of the fuel and waste, however, is slightly increased over the conventional incinerators because the waste is propagating downstream in a circular or annular route as opposed to propagating downstream in the traditional axial route. This circular or annular orientation is achieved since the waste is injected into the incipient air vortex and is thus carried throughout the formation and dissipation of each distinct vortex.

An embodiment of the present invention further includes a control subsystem (50) which comprises a sensor (52) or a plurality of sensors. These sensors (52) are disposed in the combustion chamber (16) approximately one inch downstream from the combustor dump station (15). The sensors (52) are preferably pressure transducers and are positioned so as to measure the pressure oscillations in the combustion chamber (16). The pressure measurements of the sensors (52) are then fed into a controller device (54) which is adapted for receiving and processing this information. The controller device (54) is further connected to the fuel and waste regulator (40) and the vortex generating actuator (20) and thus monitors and controls the operating characteristics of the incinerator (10).

Specifically, the controller device (54) utilizes the sensor (52) output values to actively control the frequency, phase shift, and magnitude of the vortex generating actuator output in order to generate the large scale, coherent vortices within the combustion chamber (16). Further, the controller device (54) utilizes the combustion chamber (16) pressure measurements, together with the vortex generating actuator input signal (55) to control the frequency, phase and rate of the fuel and waste injection.

The by-products of the combustion process are passed through the exhaust nozzle (18) and into an exhaust collector (56) where the residual gases may be analyzed. It is also possible to incorporate the results of the residual gas analyzer (58) into the controller device (54) to further adjust the vortex generating actuator (20) and the fuel modulator (40).

Figure 2:
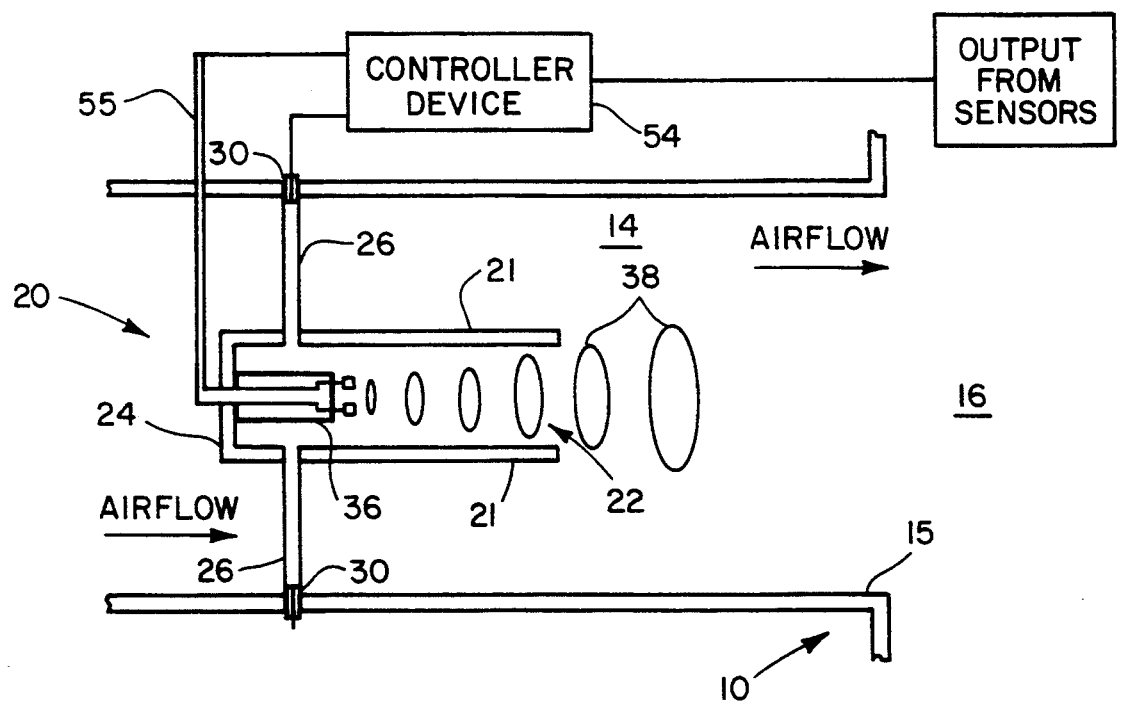
FIG. 2 is a partial view of the preferred vortex generating actuator depicting the fuel injector, the spark igniter, and the propagation of discrete flame kernels toward the combustion chamber where large scale coherent vortices are generated.

FIG. 2 illustrates the preferred vortex generating actuator (20). As stated previously, the preferred actuator is a spark actuator and more specifically a flame kernel pulse actuator. The flame kernel pulse actuator was initially developed based on the theory that periodic chemical heat release at a position upstream of the combustor would increase the acoustic power level within the combustion device. If this increased acoustic power level could be accomplished while maintaining amplitude and phase control of the energy source, the resulting pressure oscillations could act to produce discrete and coherent vortices forming proximate the entrance to the combustion chamber (16).

The principle of operation is based on convected flame kernels in a duct of premixed fuel and air which produce discrete pressure oscillations due to their energy release. Because the source of the energy release is essentially a chemical reaction, the flame kernel pulse actuator is able to produce the required energy release even at high operating pressures. This feature is an improvement over devices that produce mechanically induced or acoustic oscillations which are practical only when utilized at ambient or low operating pressures.

The flame kernel pulse actuator (20) comprises an actuator housing (21) which is placed in the transtage duct (14) of an incinerator (10). The actuator housing (21) has an open aft end (22) which is preferably positioned in a downstream orientation with respect to the airflow in the incinerator (10). The open aft end (22) of the actuator housing (21) is preferably placed at least three inches upstream of the combustor dump station (15) and is centrally disposed in an axial orientation. In the preferred embodiment of the flame kernel pulse actuator (20), the actuator housing (21) is a ⅜ inch cylindrical tube with an open aft end (22). The actuator housing (21) further has an inlet (26) proximate the forward end (24) where a mixture of fuel and air enters the actuator housing (21).

The flame kernel pulse actuator (20) further includes an auxiliary fuel injection system (30) which is adapted for supplying fuel to the flame kernel pulse actuator housing (21). The auxiliary fuel injection system (30) is preferably adapted to produce a air and fuel mixture which is introduced to the actuator housing (21) via the inlet (26) which is near the forward end (24) of the actuator housing (21).

The flame kernel pulse actuator (20) further comprises an igniter (36) which is centrally disposed in the actuator housing (21) proximate the auxiliary fuel injection system (30). The preferred igniter (36) is a spark igniter. The operating combination of the igniter (36) and auxiliary fuel injection system (30) is adapted to produce a plurality of discrete flame kernels (38) inside the actuator housing (21) which are then convected downstream toward the open aft end (22) of the actuator housing (21) and released into the airflow.

The discrete flame kernels (38) propagate in a downstream direction and are released into the transtage duct (14). As the flame kernels (38) propagate toward the combustion chamber (16), they also release a predetermined quantity of energy into the airflow. This release of energy is dependent on the quantity of fuel injected by the auxiliary fuel injection system (30), and the frequency and energy input from the igniter (36). This periodic release of energy results is a series of discrete pressure oscillations directed toward the combustion chamber (16) which cause the formation of large scale vortices in the shear flow proximate the leading edge of the combustion chamber (16). The presence of the large scale vortices ultimately affect the mixing of the primary air and fuel mixture at the combustor dump station (15) and thus influence or control the overall stability and efficiency of the combustion process.

The discrete pressure oscillations produced by the flame kernel actuator (20) can be adjusted to yield coherent, large-scale vortices forming near the dump station of the combustion chamber (16). It is quite apparent that the frequency phase or magnitude of the generated flame kernels and corresponding pressure oscillations produced by the vortex generating actuator (20) can be continuously and actively controlled with a controller device (54) to produce the desired large scale vortices, at a designated location and at a designated time sequence in relation to the fuel and waste injection.

Figure 3:
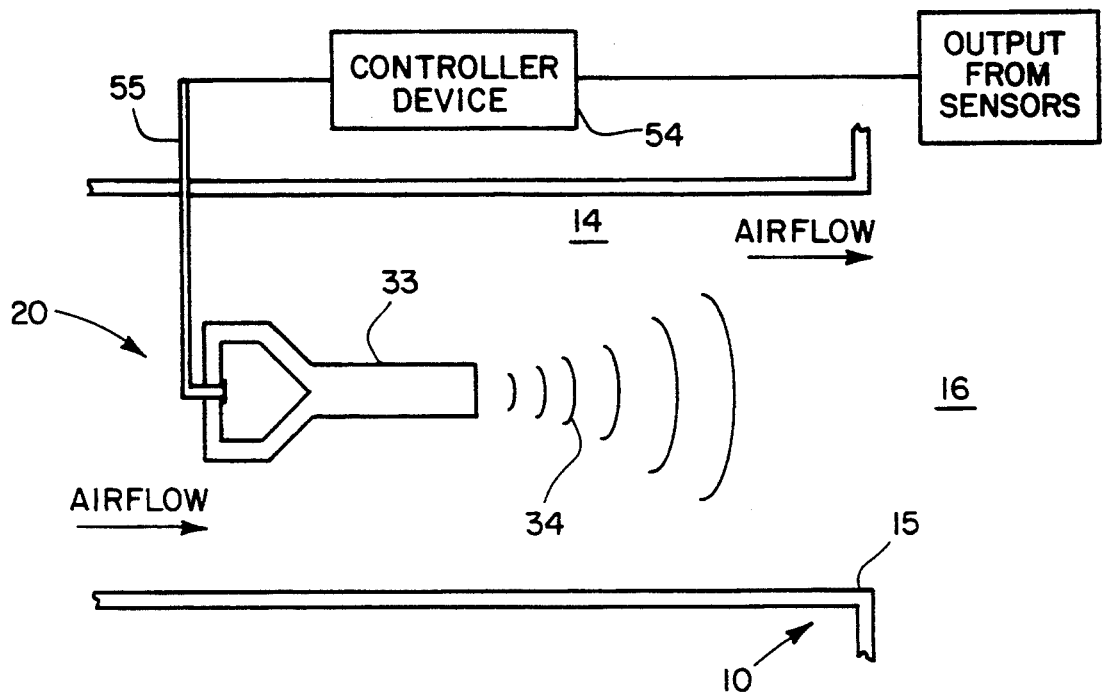
FIG. 3 is a partial view of the an alternative vortex generating actuator illustrating the use of an electro-acoustic transducer or loudspeaker to produce acoustic oscillations which propagate toward the combustion chamber where large scale coherent vortices are generated.

An alternative configuration of the vortex generating actuator is illustrated in FIG. 3. In this embodiment, the vortex generating actuator input signal (55) is received from the controller device (54) and routed to an electroacoustic transducer (33) or loudspeaker where the signal is converted to acoustic oscillations (34). The acoustic oscillations (34) propagate in a downstream direction and are released into the transtage duct (14). The acoustic oscillations (34) are transported toward the combustion chamber (16) where they cause the formation of large scale vortices in the shear flow proximate the dump station (15). The frequency, phase or magnitude of the acoustic oscillations produced by the electroacoustic transducer (33) can be easily adjusted to produce the desired large scale vortices, at a designated location and at a designated time sequence in relation to the fuel and waste injection.

Referring now to FIG. 4, the preferred fuel and waste modulator (40) for a compact incinerator (10) is shown. The fuel and waste supply (42) is introduced or injected into the fuel and waste inlet duct (17). The fuel and waste modulator (40) controls the frequency, timing, and quantity of fuel and waste injection from the fuel and waste inlet duct (17) into the combustion chamber (16). The location of the fuel and waste (42) injection is critical. The fuel and waste supply (42) are preferably injected into the incipient vortex in the shear layer of the airflow proximate the entrance to the combustion chamber (16). Fuel and waste injection at this location results in improved large scale mixing as well as excellent small scale mixing of the fuel, waste and oxidizer. The fuel modulator (40) is preferably an acoustically driven device but can also be pneumatic or mechanically driven devices. The preferred embodiment of the present invention utilizes a plurality of loudspeakers (44) to regulate the fuel and waste injection.

A similar concept for the controlled injection of fuel can be incorporated into numerous existing combustion devices. Since the fuel modulator (40) controls the frequency and timing of fuel injected into the combustion chamber (16) the efficiency and emissions resulting from a given combustion process can be controlled. In order to maximize the combustion efficiency, the fuel is injected into the incipient vortex in the shear layer of the airflow. In applications where the formation of soot is beneficial, the fuel may be injected into the center of a fully developed vortex thereby creating a fuel rich region where combustion is poor and soot is formed. Various intermediate levels of efficiency and soot formation can be achieved depending on the specific timing, frequency, and location of the fuel injection relative to the formation of the intentionally created large-scale vortices.

The interaction between fluid dynamics and chemical reaction during the combustion process ultimately affects the overall efficiency and stability of the combustion process. The mixing between the reactants participating in the combustion is a crucial part of the process. The mixing occurs in two stages; the initial stage of bringing relatively large amounts of the reactants together (large scale mixing) is dominated by vortex dynamics, and the second in which molecular contact between the reactants is promoted by small scale turbulent mixing. The large scale mixing is associated with the entrainment process through vortex dynamics. The small scale mixing is related to other flow instabilities, energy transfer between scales, and the interaction between vortices. Minimizing locations of poor mixing is important in order to reduce the formation of soot due to the localized high fuel-to-air concentrations.

As disclosed above, the timing of the fuel and waste injection is critical. The discrete pressure oscillations produced by the preferred flame kernel pulse actuator generates discrete, large scale vortices. Injection of the fuel and waste mixture at the initiation of the vortex roll-up is essential in order to achieve optimum incineration. This timing is achieved by synchronizing the fuel modulator (40) with the vortex generating actuator (20) or flame kernel pulse actuator. Preferably, a time delay device (56) and amplifier (57) are used as part of the control subsystem (50) to provide the necessary adjustment of fuel and waste injection timing relative to the vortex formation. Waste and fuel injected in this pattern will be burned more efficiently due to the high local temperatures and the longer residence time provided by the vortex roll-up time.

The embodiments of the invention described herein clearly demonstrate the capability of controlling the amount and location of soot formation in the flame by injecting fuel at the proper timing in the roll-up cycle of the air vortices. When the fuel is injected into a fully developed vortex, the vortex core becomes a fuel-rich region where the combustion is poor and soot if formed. In this situation, the vortex circumference is the only location at which the mixture was adequate for completed combustion. When fuel was injected into the incipient air vortex, complete mixing was promoted throughout the vortex and soot formation avoided. Intermediate levels of soot formation can be realized by injecting the fuel mixture at other designated points proximate the large scale vortices. The pulsed fuel injection may also occur several times throughout the formation of the discrete vortices. Such a multiple injection mode can be modulated to achieve yield higher energy outputs in addition to reduced soot emissions.

Test Results

A sudden expansion based compact incinerator was used to test the improved incinerator technique. The combustion chamber was a cylindrical structure approximately 20 inches long and approximately five inches in diameter. Air was injected in an inlet duct upstream of the combustion chamber. The inlet duct comprised a pipe approximately two and one-half inches in diameter. The fuel and waste supply included a mixture of ethylene and $SF_6$ which was injected into various locations within the incinerator. It is believed that the optimum location for the injection of fuel and surrogate waste is in the shear layer proximate to the sudden expansion plane surface or dump plane. $SF_6$ was selected as a surrogate waste due to its high thermal stability. Its use is recommended by the Environmental Protection Agency (EPA) for certification of new incinerators.

Three different incineration modes were tested and compared: standard incineration; vortex producing destabilized incineration, and active controlled incineration. The standard incineration was used for comparison purposes only and is thought to be representative of conventional incineration technology. The vortex producing destabilized incineration test was aimed to demonstrate the advantage of inducing vortical flow structures within the combustion chamber. The active controlled incineration was intended to demonstrate further advantages in the incineration process by actively controlling the injection of the fuel and waste supply relative to the vortical flow structures within the combustion chamber.

The test configuration further included a flame kernel pulse actuator which was mounted in the center of the inlet duct several inches upstream of the combustion chamber. The flame kernel pulse actuator is adapted to produce a series of discrete pressure oscillations in the inlet duct which propagate toward the combustion chamber. The magnitude, frequency, and phase of the pressure oscillations can be controlled such that they induce the roll-up of vortices proximate the dump plane. A detailed description of the flame kernel pulse actuator can be found in U.S. patent application Ser. No. 08/106,866 now pending.

The active controlled incineration test configuration further comprised a controller device or positive feedback loop which operated the flame kernel pulse actuator by monitoring the pressure fluctuations in the combustion chamber and shifted the phase of the pressure oscillations in order to further destabilize the flow within the combustor. The controller also used the signal which was fed into the flame kernel pulse actuator as a reference for the fuel and surrogate waste injection. A time delay unit provided the necessary adjustment and control of the fuel and waste injection timing relative to the vortex formation.

For purposes of these tests, the combustor was operated at a lean equivalence ratio of about 0.4 and the waste to fuel ratio was approximately 37 parts waste to 1 part fuel. The exhaust products were funneled through an exhaust nozzle and into a residual gas analyzer to ascertain the composition of the combustion products. Three different fuel and waste injection locations were explored. The most advantageous location is thought to be in the shear layer of the incipient vortex near the dump station. Alternative fuel and waste injection locations included the radial center of the inlet duct several inches upstream of the dump station and at the mid chamber position which is in the combustion chamber approximately 10 inches downstream of the dump station.

The test results are summarized in Table 1. The critical parameter shown in Table 1 is the destruction percentage of $SF_6$ as determined through the analysis of the exhaust gases. Obviously, when no combustion or incineration occurred, the percentage of $SF_6$ destroyed is approximately 0.0 percent. The regular destruction percentage required from most conventional incinerators is upward of 99.99 percent. The destruction percentages resulting from the present tests are much higher due to the very high waste to fuel ratio used in these experiments. The waste to fuel ratio in the present tests was about 37.0 whereas conventional incinerators use a waste to fuel ration of about 1.0 or less. Thus, the destruction percentages disclosed herein are provided for comparison purposes only between different test conditions.

was injected in the center of the airflow in the inlet duct and several inches upstream of the dump station, an actively controlled combustion yielded an $SF_6$ destruction percentage of less than 7%. Likewise, when the fuel and waste supply was injected in the combustion chamber about 10 inches downstream of the dump station, an actively controlled combustion yielded an $SF_6$ destruction percentage of only 15%. This downstream location is roughly at the trailing end of the vortices.

To test the concept of actively controlling the formation of soot in a combustion process, the soot formation in an annular diffusion flame was studied. Propane was chosen as a test fuel. The fuel was injected circumferentially into the air jet. Both the air and the fuel was acoustically forced with the use of several loudspeakers. The acoustic forcing altered the mean and turbulent flow field and introduced coherent vortices into both the air and fuel streams. The interaction between the vortices affected the level of mixing between the air and the fuel. The soot formation in the flame was controlled by altering the timing of the fuel injection relative to the air vortices roll-up state. For a certain time delay, is-

TABLE 1

| Incineration Mode | Fuel/Waste Injection Location | $SF_6$ Percent Destruction | Waste/Fuel Ratio | Fuel/Air Ratio | Phase Shift |
|---|---|---|---|---|---|
| No Incineration | Dump Station | 0.0% | 37.0 | 0.4 | — |
| Standard Incineration | Dump Station | 43.8% | 37.0 | 0.4 | — |
| Standard Incineration | Dump Station | 49.3% | 37.0 | 0.4 | — |
| Destabilized Incineration | Dump Station | 66.1% | 37.0 | 0.4 | — |
| Controlled Incineration | Dump Station | 69.5% | 37.0 | 0.4 | 44° |
| Controlled Incineration | Inlet Duct Center | 80.6% | 37.0 | 0.4 | 224° |
| No Incineration | Inlet Duct Center | 0.0% | 37.0 | 0.4 | — |
| Standard Incineration | Inlet Duct Center | 20.1% | 37.0 | 0.4 | — |
| Controlled Incineration | Inlet Duct Center | 6.5% | 37.0 | 0.4 | |
| No Incineration | Mid Chamber | 0.0% | 37.0 | 0.4 | — |
| Controlled Incineration | Mid Chamber | 14.6% | 37.0 | 0.4 | |

Table 1 shows the comparison of various incineration tests. The standard incineration mode is representative of regular, uncontrolled combustion. Tests using this standard incineration mode yielded an $SF_6$ destruction percentage of approximately 44% when the fuel and surrogate waste was injected in the shear flow proximate the dump station and an $SF_6$ destruction percentage of approximately 20% when the fuel and waste was injected upstream in the inlet duct.

The vortex producing destabilized incineration test employed the flame kernel pulse actuator to produce discrete vortical flow structures within the combustion chamber. The fuel and surrogate waste injection occurred in the shear layer near the dump station, but was a continuous injection. Destabilization of the combustion process by the induction of vortices, increased the $SF_6$ destruction rate to approximately 66%.

The active controlled incineration tests demonstrated additional advantages in the incineration efficiency by synchronizing the periodic injection of the fuel and waste supply and the formation of discrete vortical flow structures within the combustion chamber. At a 44° phase shift between the fuel injection actuator and vortex producing actuator, the result was an $SF_6$ destruction percentage of almost 70%. Yet at a 224° phase shift between the fuel injection actuator and vortex producing actuator, the result was an $SF_6$ destruction percentage of greater than 80%.

The importance of the waste injection location relative to the air vortices was also demonstrated by injecting the fuel and waste supply at two locations other that at the dump station. When the fuel and waste supply lands of unmixed fuel were generated inside the core of the air vortices, leading to high soot formation. Yet other time delay periods, a homogeneous mixture of air and fuel was promoted reducing the soot level to nearly zero. Details concerning the conducted tests, including detailed descriptions and results can be found in a publication written by the inventors and titled *Soot Formation in Turbulent Flames*, Paper No. 92-70, presented at the 1992 Fall Meeting Western States Section of the Combustion Institute, Oct. 12–13, 1992, herein incorporated by reference.

DETAILED DESCRIPTION OF PREFERRED METHODS

The present invention provides active control on the combustion process by exploiting fluid dynamical vortical structures as a localized combustor whose properties are more easily manipulated. The fuel and waste supply synchronized injection brings the combustible components into the optimal location for efficient incineration.

The described use of the flame kernel pulse actuator as a vortex generating actuator (20) synchronized with a fuel modulator (40) as in the aforementioned tests, is but an example of the improved method for actively controlling an incineration process. The preferred method for actively controlling an incineration process would involve the following steps.

(a) Producing a series of discrete, coherent large scale vortices proximate to the entrance to the combustion chamber with a device such as the vortex generating actuator;

(b) Injecting the fuel and waste supply into the incipient vortex in the shear layer at the initiation of vortex roll-up. The controlled injection can be accomplished with a fuel regulator or similar device. Waste and fuel injected in this manner will benefit from a longer residence time provided by the vortex roll-up time. In addition better mixing of the fuel and air due to the vortex dynamics will result in more efficient burning and higher localized temperatures;

(c) Measuring certain attributes of the combustion process in the combustion chamber, with the use of various sensors; and (d) Processing the measurements of the sensors with the aid of a controller device. This controlled device is preferably adapted for receiving and processing the sensor measurements. The controlled device is also connected to the vortex generating actuator and the fuel regulator or similar devices so that it continuously and actively adjusts the output frequency, magnitude or phase shift of the actuator and regulator to produce the discrete, coherent, large scale vortices, at a designated location and at a designated time sequence in relation to the fuel and waste injection.

In the preferred embodiment, the step of producing a series of discrete, coherent, large-scale vortices further comprises the step of:

Producing a series of discrete flame kernels upstream of the combustion chamber preferably in the transtage duct or inlet duct of a given combustion device. These discrete flame kernels are then convected toward the combustion chamber. As the flame kernels are moving downstream, they release a predetermined quantity of chemical heat or energy into duct upstream of the combustion chamber. This periodic chemical heat release produces discrete pressure oscillations in the duct which also propagate toward the combustion chamber, thereby producing a series of discrete coherent large-scale vortices proximate to the entrance to the combustion chamber.

Likewise, in the preferred embodiment, the step of injecting the fuel and waste into the incipient vortex further comprises the step of:

Producing a series of acoustic oscillations in the fuel and waste inlet duct with a fuel regulator. The fuel regulator is preferably a electro-acoustic transducer or electro-mechanical transducer. In the preferred embodiment, a plurality of loudspeakers are used which are synchronized with the generation of the air vortex such that a specified amount of fuel and waste is injected into the incipient vortex in the shear layer at the initiation of vortex roll-up.

Since the controlled injection of fuel into air vortices can be adjusted to minimize soot emissions or to maximize soot emissions in applications where the presence of soot is beneficial, there exists yet another method for actively controlling a combustion process for the purposes of producing a given quantity of soot and other combustion products. This method involves the following steps;

(a) Producing a series of discrete, coherent large scale vortices proximate to the flameholder within a combustor with a device such as the vortex generating actuator or other vortex generating means;

(b) Injecting the fuel supply into the various positions of the vortices. This controlled injection can be accomplished with a fuel modulator or similar device. Fuel injected in this manner will result in varying degrees of mixing between the fuel and air, which affects the burning process, and consequently the formation of soot and other combustion products; and (c) actively controlling the timing and location of the pulsed fuel injection relative to the formation of the vortices with a controller device, the controller device being connected to the vortex generating means and the fuel modulator in order to synchronize and actively control the phase shift between the formation of the large scale vortices and the pulsed injection of the fuel in response to predetermined inputs.

This preferred method for actively controlling the a combustion process can be tailored to operate in a closed loop mode or an open loop mode. In the closed loop system the preferred method comprises the following additional steps:

measuring certain attributes of the combustion process and analyzing the by-products of the combustion process with the use of various sensors; and processing any measurements of the various sensors with the controller device, the controller device being operatively connected to the vortex generating means and the fuel modulator in order to synchronize and actively control the phase shift between the formation of the large scale vortices and the pulsed injection of the fuel in response to the sensor measurements.

From the forgoing description, those skilled in the art will appreciate that all the objects, advantages and features of the present invention are realized. A method and apparatus has been shown and described for providing active control of an incineration device and more particularly a compact incinerator. In addition, a method and apparatus for controlling the formation of soot in a combustion process has also been disclosed.

While a specific embodiment has been shown and described, many variations are possible. Those persons skilled in the art will appreciate that certain modifications may be made to the invention without departing from its spirit, therefor it is not intended that the scope of the invention be limited to the specific embodiment illustrated and described. Rather, it is intended that the scope of this invention be determined by the appending claims and their equivalents.

What is claimed as the invention is:

1. A method for actively controlling a combustion process comprising the following steps:

producing a series of discrete, coherent large scale vortices in a combustion chamber with a vortex generating means;

injecting a fuel supply proximate the vortices with a fuel modulator, the fuel modulator adapted for inducing the pulsed injection of fuel into the vortices at designated locations relative to the formation of the vortices within the combustion chamber thereby affecting the mixing of the fuel with the oxidizer, the efficiency of the burning, and the amount of combustion products formed during the combustion process; and controlling the timing and location of the pulsed fuel injection relative to the formation of the vortices within the combustion chamber with a controller device, the controller device being operatively connected to the vortex generating means and the fuel modulator in order to synchronize and actively control the phase shift between the formation of the large scale vortices and the pulsed injection of the fuel in response to predetermined inputs.

2. A method for actively controlling the a combustion process of claim 1 wherein the method for actively controlling the a combustion process is a closed loop system further comprising the following steps:

measuring certain attributes of the combustion process and analyzing the by-products of the combustion process with the use of various sensors; and processing any measurements of the various sensors with the controller device, the controller device being operatively connected to the vortex generating means and the fuel modulator in order to synchronize and actively control the phase shift between the formation of the large scale vortices and the pulsed injection of the fuel in response to the sensor measurements.

3. The method for actively controlling the combustion process of claim 1 wherein the vortex generating means is a vortex generating actuator.

4. The method for actively controlling the combustion process of claim 1 wherein the controller device is further adapted to actively control and synchronize the frequency, phase shift, and magnitude of the large scale vortices generated by the vortex generating means together with frequency, timing, and rate of the pulsed injection of the fuel.

5. The method for actively controlling the combustion process of claim 1 wherein the method actively controls the formation of soot and other combustion products in a combustion process.

6. The method for actively controlling the combustion process of claim 1 wherein the method actively controls the combustion efficiency and energy output in a combustion process.

7. An apparatus for actively controlling a combustion process including the formation of soot and other combustion products, the apparatus comprising:

a vortex generating means disposed in a combustion device proximate a flameholder, the vortex generating means adapted for the generation of discrete, coherent, large scale vortices within a combustion chamber;

a fuel modulator disposed proximate the combustion chamber and adapted for adjusting and controlling the injection of fuel into vortices within the combustion chamber where the fuel can be mixed with an oxidizer and burned; and a controller subsystem adapted to monitoring the soot formation resulting from the combustion process and, in response to said monitoring of soot formation, actively controlling the frequency, phase shift, and magnitude of the large scale vortices generated by the vortex generating actuator as well as frequency, timing, and rate of the fuel injection so that the fuel can be introduced at various locations relative to the formation of the vortices thereby affecting the mixing of the fuel with the oxidizer, the efficiency of the burning, and the amount of soot formed during the combustion process.

8. The apparatus for actively controlling the soot formation in a combustion process as set forth in claim 7 wherein the vortex generating means further comprises a vortex generating actuator.

9. An apparatus for actively controlling a compact incinerator comprising:

an incinerator housing which defines an air inlet and transtage duct, a combustion chamber, a fuel and waste inlet duct, and an exhaust nozzle;

a vortex generating actuator disposed in the inlet and transtage duct of the incinerator housing and adapted for the generation of coherent, large scale vortices in the combustion chamber proximate the fuel and waste inlet duct;

a means to regulate the injection of the fuel and waste disposed proximate the fuel and waste inlet duct and adapted for inducing the pulsed injection of fuel and waste into the incipient vortex; and an incineration controller device connected to the vortex generating actuator and the means to regulate the injection of the fuel and waste, the controller device is further adapted for receiving and processing information collected from various sensors located in the combustion chamber in order to actively control the frequency, phase shift, and magnitude of the large scale vortices generated by the vortex generating actuator as well as frequency, timing, and rate of the pulsed injection of the fuel and waste.

10. The apparatus for actively controlling a compact incinerator of claim 9 wherein the vortex generating actuator further comprises:

an actuator housing adapted for attachment within the air inlet and transtage duct of the incinerator, the actuator housing defining an open aft end facing in a downstream orientation;

an auxiliary fuel injection means adapted for supplying a fuel and air mixture within the actuator housing; and an igniter disposed in the actuator housing which in conjunction with the auxiliary fuel injection means produces a plurality of discrete flame kernels which are convected toward the open aft end of the actuator housing and released into the inlet duct, the discrete flame kernels further releasing a predetermined quantity of energy thereby producing discrete pressure oscillations which produce coherent, large scale vortices in the combustion chamber proximate the fuel and waste inlet duct.

11. The apparatus for actively controlling a compact incinerator of claim 10 wherein the actuator housing is a cylindrical tube defining an open aft end and an inlet proximate a forward end, the cylindrical tube being centrally and axially oriented in the inlet and transtage duct of the incinerator.

12. The apparatus for actively controlling a compact incinerator of claim 11 wherein the auxiliary fuel injection means is adapted for producing an air and fuel mixture which is introduced into the actuator housing via the inlet proximate the forward end of the actuator housing.

13. The apparatus for actively controlling a compact incinerator of claim 12 wherein the igniter is a spark igniter disposed proximate the inlet of the actuator housing.

14. The apparatus for actively controlling a compact incinerator of claim 10 wherein controller device is operatively connected with the auxiliary fuel injection means and the igniter so as to actively control one or more of the parameters consisting of frequency, phase shift, and amplitude of the discrete flame kernels which in turn control the frequency, phase shift, and magnitude of the large scale vortices within the combustion chamber.

15. The apparatus for actively controlling a compact incinerator of claim 9 wherein the means to regulate the injection of the fuel and waste is an electro-acoustic transducer.

16. The apparatus for actively controlling a compact incinerator of claim 15 wherein the electro-acoustic transducer is a loudspeaker.

17. The apparatus for actively controlling a compact incinerator of claim 9 wherein the means to regulate the injection of the fuel and waste is an electro-mechanical fuel regulator.

18. The apparatus for actively controlling a compact incinerator of claim 9 wherein the vortex generating actuator further comprises an electro-mechanical or electro-acoustical transducer disposed in the inlet and transtage duct of the incinerator housing and adapted for the generation of coherent, large scale vortices in the combustion chamber proximate the fuel and waste inlet duct.

19. The apparatus for actively controlling a compact incinerator of claim 9 further comprises an exhaust gas collector and a residual gas analyzer proximate the exhaust nozzle of the incinerator in order to analyze any by-products of the incineration process and input any results of the analysis to the controller device.

20. An apparatus for actively controlling a compact incinerator comprising:
   an incinerator housing which defines an air inlet and transtage duct, a combustion chamber, a fuel and waste inlet duct, and an exhaust nozzle;
   a flame kernel pulse actuator disposed in the inlet and transtage duct of the incinerator housing, the flame kernel pulse actuator is adapted for producing a plurality of discrete flame kernels which are convected toward the combustion chamber, the discrete flame kernels further release a predetermined quantity of energy so as to produce discrete pressure oscillations which in turn produce coherent, large scale vortices in the combustion chamber proximate the fuel and waste inlet duct;
   a fuel regulator disposed proximate the fuel and waste inlet duct and adapted for producing a pulsed injection of fuel and waste into the incipient vortices; and
   an incineration controller device in operative association with the flame kernel pulse actuator and the fuel regulator so as to actively control the frequency, phase shift, and magnitude of the large scale vortices generated by the flame kernel pulse actuator as well as frequency, phase shift, and amplitude of the fuel regulator output in response to information received and processed from various sensors located in the combustion chamber.

21. The apparatus for actively controlling a compact incinerator of claim 20 wherein the flame kernel pulse actuator further comprises:
   an actuator housing adapted for attachment within the air inlet and transtage duct of the incinerator, the actuator housing defining an open aft end facing in a downstream orientation;
   an auxiliary fuel injection means adapted for supplying a fuel and air mixture within the actuator housing; and
   a spark igniter disposed in the actuator housing which in conjunction with the auxiliary fuel injection means produces a plurality of discrete flame kernels which are convected toward the open aft end of the actuator housing and released into the inlet duct, the discrete flame kernels further releasing a predetermined quantity of energy thereby producing discrete pressure oscillations which produce coherent, large scale vortices in the combustion chamber proximate the fuel and waste inlet duct.

22. The apparatus for actively controlling a compact incinerator of claim 20 wherein controller device further comprises a time delay device for synchronizing the operation of the fuel regulator with the flame kernel pulse actuator to ensure pulsed injection of the fuel and waste mixture at the initiation of the vortex roll-up.

23. The apparatus for actively controlling a compact incinerator of claim 20 wherein the fuel regulator is an electro-acoustic transducer such as a loudspeaker.

24. A method for actively controlling an incineration process comprising the following steps:
   producing a series of discrete, coherent large scale vortices proximate to an entrance to a combustion chamber with a vortex generating actuator, the vortex generating actuator being disposed in an inlet and transtage duct of an incinerator housing;
   injecting a fuel and waste supply into the incipient vortex with a fuel regulator, the fuel regulator disposed proximate to a fuel and waste inlet duct and adapted for inducing the pulsed injection of fuel and waste into the incipient vortex in the shear layer at the initiation of vortex roll-up;
   initiating the combustion process by igniting the fuel, waste and oxidizer mixture; measuring certain attributes of the combustion process in the combustion chamber, with the use of various sensors; and
   processing the measurements of the sensors with the aid of a controller device, the controller device is operatively connected to the vortex generating actuator and the fuel regulator in order to actively control and synchronize frequency, phase shift, and magnitude of the large scale vortices generated by the vortex generating actuator together with frequency, timing, and rate of the pulsed injection of the fuel and waste in response to the measurements of the sensors.

25. The method for actively controlling an incineration process of claim 24 wherein the step of producing a series of discrete, coherent, large-scale vortices further comprises generating a series of discrete flame kernels upstream of the combustion chamber which release a predetermined quantity of energy as the flame kernels propagate downstream and enter the airflow, the release of energy produces a series of discrete pressure oscillations in the inlet and transtage duct thereby producing a series of discrete coherent large-scale vortices proximate to the entrance to the combustion chamber.

26. The method for actively controlling an incineration process of claim 24 wherein the step of injecting a fuel and waste supply into the incipient vortex further comprises the step of generating a series of acoustic oscillations in the fuel and waste inlet duct with an electro-acoustic transducer, the acoustic oscillations are synchronized with the generation of the air vortices to produce a pulsed injection of fuel and waste into the incipient vortex in the shear layer at the initiation of vortex roll-up.

* * * * *